Patented Mar. 12, 1935

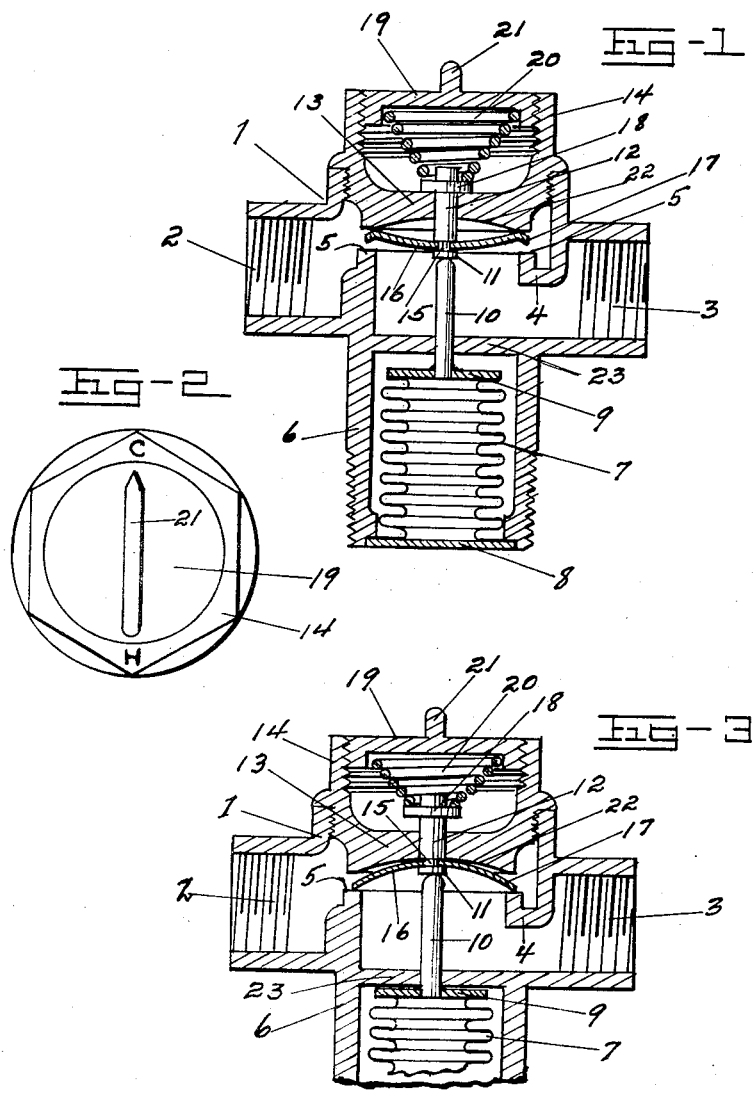

1,993,814

UNITED STATES PATENT OFFICE 1,993,814

THERMOSTATIC VALVE

Sidney P. Vaughn, United States Navy,
Ackerman, Miss.

Application March 3, 1934, Serial No. 713,877

9 Claims. (Cl. 236—48)

(Granted under the act of March 3, 1883, as
amended April 30, 1928; 370 O. G. 757)

I agree that the invention may be manufactured and used by or for the Government for governmental purposes without the payment to me of any royalty thereon.

This invention relates to thermostatic apparatus in general, but more particularly to thermostatic devices for automatically controlling the temperature of water heaters and the like which are heated by gaseous fuels.

The principal object of my invention is to devise a form of snap action thermostatic valve that is sensitive to temperature changes, positive in action, simple in construction and reliable in operation.

Another object is to provide a simple type of snap action element which acts as a valve member, and to construct the valve so that the entire snap action assembly and valve may be readily removed for cleaning purposes without disturbing the temperature adjustment.

With the above and other objects in view the invention may be said to comprise the device illustrated in the accompanying drawing and described in the following specifications, together with such variations and modifications thereof as will be apparent to those skilled in the art to which the invention appertains.

Referring to the drawing:

Fig. 1 is a central longitudinal sectional view through a snap action thermostatic valve made in accordance with my invention and showing the valve in an open position.

Fig. 2 is an end view of the valve body showing the temperature adjusting device.

Fig. 3 is a view of Fig. 1 showing the valve in a closed position.

Like numerals refer to like parts throughout the several views.

Referring to the drawing a thermostat embodying my invention is illustrated and comprises a valve body 1 having an inlet 2 and an outlet 3. Within the valve body a partition 4 is formed having a valve opening therein surrounded by an annular raised portion to provide a valve seat 5. The body is formed with an externally threaded tubular extension 6 arranged concentrically on one side of the valve body with the valve seat and adapted to be screwed into the wall of a fluid container (not shown). The inlet 2 is adapted to connect with a supply of gaseous fuel and the outlet is adapted to connect with the burner used to heat the fluid container.

The threaded end of the tubular extension 6 is closed fluid tight by a disk plug 8 which also acts as a fluid tight closure for one end of an expansible and collapsible thermostatic bellows 7 arranged concentrically with the valve seat within the tubular extension and extending toward a partition 23 separating the chamber of the tubular extension from the outlet chamber of the valve body. This partition is provided to keep the gases flowing through the valve body from making contact with the thermostatic bellows and affecting its temperature. The upper end of the bellows 7 is closed fluid tight by a head member 9 to which is secured a plunger 10 extending into the outlet chamber through an opening formed in the partition 23. A quantity of expansible and contractible or volatile liquid of a predetermined character and quantity, depending upon the thermal conditions under which the device is to operate, is introduced into the fluid tight bellows to form a thermostatic cell responsive to temperature changes. A rise in temperature will cause the bellows to expand and a fall in temperature will cause the bellows to contract.

The plunger 10 makes contact with the lower end 11 of a valve stem 12 arranged concentrically therewith and extending upwardly through a guide opening formed in the lower closed end 13 of a hollow plug member 14 screwed in the bore of the inlet chamber of the valve body and arranged concentrically with the valve seat. The lower side 22 of the closed end 13 of the plug 14 is slightly concave to form an annular abutment concentric with and substantially in alignment with the valve seat 5 but spaced therefrom so that it together with the valve seat will form two opposing annular abutment members between which the edge of a concavo-convex snap disk or valve member 16 is actuated from one abutment member to the other in opening and closing the valve. The snap disk may be made of any suitable spring metal and should be so dished that it will have the property of remaining in either one of its two opposing positions until and when snapped from one position to the other. The center of the snap disk is mounted on a neck 15 of the valve stem and when it is in the concavo-convex position illustrated in Fig. 1, the edge of the disk is slightly cupped toward the valve seat to make a sharp line contact with the valve seat when the disk is snapped into a reverse form as illustrated in Fig. 3. The disk is so arranged that the center of the disk is permitted to move a little more than the distance between the annular abutment members so that when the center of the disk is moved in either direction slightly beyond dead center the tension set up in the metal will cause the edge of the disk to move rapidly in a direction opposite to the movement of the center of the disk and make contact with the opposite abutment.

A heavy compression spring 20 acting between a collar 18 on the upper end of the valve stem and a second adjustable plug 19 screwed in the upper end of the hollow plug 14 to exert a downward yielding pressure on the valve stem against any upward yielding pressure that may be exerted by the thermostatic bellows 7. By virtue of this arrangement the center of the snap disk or valve member 16 is moved from one extreme position to the other by the difference in pressures exerted by the spring and the bellows. In Fig. 1 the valve is shown open and the disk has a concavo-convex form with its edge in contact with the annular abutment formed in the lower side of the plug 14. In Fig. 3 the valve is shown closed with the disk having a reverse or convexo-concave form and with the edge of the disk in contact with the valve seat.

In operation assume that the temperature is such that the valve is open as illustrated in Fig. 1. As the temperature rises a pressure is developed within the bellows and causes it to expand, and force the plunger 10 against the valve stem. When the upward pressure is sufficent to overcome the downward pressure exerted by the spring and the resistance offered by the snap disk, the disk will snap into a reverse form and close the valve as illustrated in Fig. 3. When the temperature drops the pressure within the bellows will be reduced. When the downward pressure exerted by the spring 20 is sufficient to overcome the upward pressure of the bellows and the resistance offered by the snap disk, the disk will snap back into its orginal position and open the valve. Since the valve seat acts as an abutment member to resist the downward pressure exerted by the spring, a tight seating is assured until the valve is snapped open.

The temperature at which the valve will operate to an open position is regulated by screwing in or out the plug 19 which increases or decreases the downward pressure exerted by the spring 20. Fig. 2 illustrates the top of the plugs 14 and 19 and a pointed finger piece 21 attached to the plug for turning it to any position to a suitably marked scale on the plug 14. Turning the plug 21 to the right increases the pressure on the spring and increases the temperature necessary to close the valve.

Changes may be made in the construction and arrangement of the parts of my device without departing from the real spirit and purpose of my invention and it is my intention to cover by claims, any modified forms of structure or use of mechanical equivalents, which may be reasonably included within their scope.

I claim:

1. In a thermostatic device of the character described, the combination of a valve body, a valve seat therein, an annular abutment or shoulder in spaced relation to said valve seat and concentric therewith, a valve member comprising a concavo-convex spring disk having two opposed limiting positions arranged concentrically between the valve seat and the abutment member so that the disk makes a sharp line contact with the seat when the valve is closed and contact with the abutment when the valve is opened, said disk being actuated from one position to the other by a pressure applied to the convex side at its center, a thermostatic element movable according to temperature variations to actuate the valve to a closed position and a compression spring to actuate the valve to an open position.

2. A device as described in claim 1 wherein the valve is supported by a valve stem on the same axis as the compression spring and the thermostatic element.

3. A device as described in claim 1 and including adjustments to increase or decrease the actuating pressure of the compression spring.

4. A device as described in claim 1, wherein the compression spring, the abutment member, the spring disk or valve member, the valve seat, and the thermostatic element are concentrically arranged with relation to each other in the order named.

5. A device as described in claim 1 wherein the annular abutment or shoulder is formed on the inner end of a hollow plug screwed in the bore of the inlet chamber of the valve body concentric with the valve seat and wherein the compression spring is supported in the bore of the plug and acting between an adjustment member closing the bore of said plug and a valve stem supporting the valve member.

6. A snap acting structure comprising in combination, two annular abutment members arranged concentrically in spaced relation to each other, a concavo-convex spring disk having two opposed limiting positions arranged concentrically between the abutment members so that the edge of the disk will make a line contact with one of the abutment members when in one position and make contact with the other abutment member when in the other position, a thermostatic element movable according to temperature variations arranged to actuate said spring disk from one of its opposed limiting positions to the other, and a compression spring acting toward the thermostatic element to actuate the spring disk to an opposite position when the pressure exerted by the thermostatic element is less than the pressure exerted by the compression springs.

7. A device as described in claim 6, wherein adjustment means are provided for increasing or decreasing the actuating pressure of the compression spring.

8. A device as described in claim 6, wherein the thermostatic element comprises an expansible and collapsible bellows actuated to an expended position by an expansible and contractible or volatile fluid.

9. A device as described in claim 1 and including stops to limit the travel of the center of the concavo-convex spring disk when it is snapped into a reverse form to make line contact with either the valve seat or the annular abutment member, and to prevent the edge of the disk being pushed away from the valve seat after the disk has been snapped to make contact therewith.

SIDNEY P. VAUGHN.